(12) United States Patent
Ieda et al.

(10) Patent No.: US 7,819,442 B2
(45) Date of Patent: Oct. 26, 2010

(54) APPARATUS FOR OPENING AND CLOSING VEHICLE DOOR

(75) Inventors: Kiyokazu Ieda, Chiryu (JP); Takeshi Ito, Chiryu (JP)

(73) Assignee: Aisin Seiki Kabushiki Kaisha, Kariya-Shi, Aichi (JP)

( * ) Notice: Subject to any disclaimer, the term of this patent is extended or adjusted under 35 U.S.C. 154(b) by 426 days.

(21) Appl. No.: 11/630,369

(22) PCT Filed: Jun. 21, 2005

(86) PCT No.: PCT/JP2005/011314
§ 371 (c)(1), (2), (4) Date: Dec. 21, 2006

(87) PCT Pub. No.: WO2005/124066
PCT Pub. Date: Dec. 29, 2005

(65) Prior Publication Data
US 2008/0290668 A1   Nov. 27, 2008

(30) Foreign Application Priority Data
Jun. 22, 2004   (JP) .............................. 2004-184143

(51) Int. Cl.
*E05B 3/00* (2006.01)
*E05B 65/10* (2006.01)
(52) U.S. Cl. ................ 292/336.3; 292/92; 292/DIG. 65
(58) Field of Classification Search .................. 292/92, 292/336.3, DIG. 65; 340/5.72, 425.5; 341/34; 70/262–266
See application file for complete search history.

(56) References Cited

U.S. PATENT DOCUMENTS 2,273,570 A * 2/1942 Greenlees .................... 362/501

(Continued)

FOREIGN PATENT DOCUMENTS

DE        198 09 716 A1     9/1999

(Continued)

OTHER PUBLICATIONS

Computer generated translation of FR 2512870, http://gb.espacenet.com/search97cgi/s97_cgi.exe?Action=FormGen&Template=gb/EN/home.hts.*

(Continued)

*Primary Examiner*—Peter M Cuomo
*Assistant Examiner*—Alyson M Merlino
(74) *Attorney, Agent, or Firm*—Buchanan Ingersoll & Rooney PC

(57) ABSTRACT

There is provided an apparatus for opening and closing a vehicle door that is exceptionally durable and performs indications so that a person can reliably recognize a locked or unlocked state of a vehicle door.

The apparatus for opening and closing a vehicle door comprises control means for recognizing the intention of a person to lock or unlock a vehicle door 6 and controlling the locking or unlocking of the vehicle door 6. The apparatus is characterized in comprising a door handle 2 with which the vehicle door 6 is opened or closed; an operation detector 3 provided to the door handle 2 in order to detect a state of the door handle 2 as operated by the person; an ornamental light part 40 that is provided so as to enclose a periphery of the operation detector 3, and is visible from the exterior of the door handle 2 during actuation of the operation sensor 3 by the person; and a light-emitting part 4 for illuminating the ornamental light part 40. The light-emitting part 4 is energized by the control means according to a controlled state in which the vehicle door 6 is locked or unlocked.

19 Claims, 8 Drawing Sheets

U.S. PATENT DOCUMENTS

| | | | |
|---|---|---|---|
| 5,297,010 A * | 3/1994 | Camarota et al. | 362/501 |
| 6,070,998 A | 6/2000 | Jennings et al. | |
| 6,164,805 A | 12/2000 | Hulse | |
| 6,648,493 B2 | 11/2003 | Klein | |
| 6,848,818 B2 * | 2/2005 | Huizenga | 362/501 |
| 7,049,940 B2 | 5/2006 | Ieda et al. | |
| 7,333,021 B2 * | 2/2008 | Ieda et al. | 340/641 |
| 2002/0030594 A1 * | 3/2002 | Inaba et al. | 340/562 |
| 2002/0157436 A1 * | 10/2002 | Klein | 70/257 |
| 2003/0031025 A1 | 2/2003 | Huizenga | |
| 2003/0095416 A1 | 5/2003 | Huizenga | |
| 2003/0122556 A1 * | 7/2003 | Sueyoshi et al. | 324/686 |
| 2004/0059483 A1 | 3/2004 | Sukakura | |
| 2004/0075531 A1 * | 4/2004 | Ieda et al. | 340/5.72 |
| 2004/0104815 A1 * | 6/2004 | Suyama et al. | 340/426.16 |
| 2004/0223336 A1 * | 11/2004 | Murakami et al. | 362/501 |
| 2004/0233677 A1 | 11/2004 | Su et al. | |
| 2004/0262139 A1 * | 12/2004 | Ieda et al. | 200/341 |
| 2005/0047162 A1 * | 3/2005 | Baek | 362/501 |

FOREIGN PATENT DOCUMENTS

| | | |
|---|---|---|
| DE | 198 22 733 C2 | 11/1999 |
| DE | 100 60 780 A1 | 6/2002 |
| EP | 0 926 004 A2 | 6/1999 |
| EP | 1 479 857 A1 | 11/2004 |
| FR | 2 512 870 | 3/1983 |
| JP | 1-112261 U | 7/1989 |
| JP | 1-135889 U | 9/1989 |
| JP | 01-275239 A | 11/1989 |
| JP | 2-33764 U | 3/1990 |
| JP | 2-93477 U | 7/1990 |
| JP | 2760089 B2 | 3/1998 |
| JP | 2000-045593 A | 2/2000 |
| JP | 3193587 B2 | 5/2001 |
| JP | 2001-171452 A | 6/2001 |
| JP | 2001-336321 A | 12/2001 |
| JP | 2002-213127 A | 7/2002 |
| JP | 2004-027559 A | 1/2004 |
| JP | 2004-098844 A | 4/2004 |
| JP | 2004-244990 A | 9/2004 |

OTHER PUBLICATIONS

Official Action issued in priority JP Patent Application No. 2004-184143, May 22, 2008, JPO, with English-language translation.
International Search Report.

* cited by examiner

APPARATUS FOR OPENING AND CLOSING VEHICLE DOOR

TECHNICAL FIELD

The present invention relates to an apparatus for opening and closing a vehicle door, comprising control means for recognizing the intention of a person to lock or unlock the vehicle door and controlling the locking and unlocking of the vehicle door.

BACKGROUND OF THE INVENTION

There are locking systems (smart-entry systems) that detect when a person approaches or exits a vehicle, recognize the intention of the person to lock or unlock the vehicle door, and automatically control the locking and unlocking of the vehicle door. However, these systems lack convenience in that if the person has not been informed as to whether a vehicle door controlled by such a smart-entry system is locked or unlocked, ultimately the person must verify each time whether the vehicle door is locked or unlocked.

Patent Document 1 discloses a technique for wirelessly locking and unlocking a vehicle door from outside the vehicle based on a method for indicating the state of the vehicle door in a so-called keyless entry. It is proposed in this patent document that, when the vehicle door is locked or unlocked, the quantity or type of emitted light by the interior illumination, headlights, taillights, or the like is determined in correspondence with the brightness of the surroundings of the vehicle, and a light control signal is outputted; or the volume or tone of a buzzer is determined in correspondence with the brightness of the surroundings of the vehicle, and a sound control signal is outputted. Specifically, when the surroundings are bright, such as during daytime, the state may not be readily recognized via emitted light alone; therefore, the emitted light is minimized and a sound is produced by a buzzer. When the surroundings are dark, such as in the evening or at night, the buzzer is minimized and light is emitted.

Patent Document 2 discloses a system wherein the exterior part of a door handle grip part is composed of a light-permeable or transparent material, and the interior is provided with a light source. If applied to a smart-entry system, this configuration is able to indicate locking and unlocking in an easily visible location when a person enters or exits the vehicle.

Patent Document 1: Japanese Patent Application "kokai" No. 2000-45593 (Pages 4 through 5, FIG. 2)

Patent Document 2: German Patent No. 10060780 Specification (FIG. 2)

SUMMARY OF THE INVENTION

However, according to the art described in Patent Document 1, the interior illumination, headlights, taillights, and the like are positioned away from the handle that a person uses to open or close the vehicle door. Therefore, in the apparatus for opening and closing a vehicle door in a smart-entry system that automatically locks or unlocks when a person operates the door handle, the person cannot necessarily reliably recognize the state of the vehicle door.

With smart-entry systems, the person does not use a wireless key, and the intention to lock or unlock is recognized by the vehicle, whereupon locking or unlocking is then carried out. Therefore, this intention must be accurately transmitted to the vehicle. The intention is often transmitted based on an action of the person attempting to open or close the vehicle door, such as the action of placing a hand on the door handle. When the surroundings are dark, such as at night, people have difficulty in determining the location of the door handle to be operated and thus may not be able to accurately operate the door handle. In such circumstances, a smart-entry system does not smoothly lock and unlock the vehicle door, which should be performed automatically, and thus lacks convenience.

When the vehicle door is locked using a smart-entry system after the person has exited the vehicle, the intention to lock is often recognized by a sensor, switch, or other device provided to the exterior of the door handle. This sensor, switch, or other device has an effect on the appearance of the vehicle, and is therefore often installed in a small area generally a little larger than a postage stamp on the exterior of the door handle. When parking at night in an unlit location, the person may fail to visually locate the sensor or switch, or cover the location of the sensor or switch with their own finger, perhaps making it impossible for an intention to lock to be satisfactorily recognized. No method has yet been proposed to satisfactorily indicate the target location that the person should operate in order to resolve these drawbacks.

In the configuration described in Patent Document 2, the door handle part may be a member that the person operates regularly, and thus a concern is raised in that the area composed of transparent or light-permeable material may be damaged or fouled, resulting in diminished light intensity. Furthermore, the door handle part has a large hollow space and is provided with an internal light source; therefore, the configuration must ensure strength and durability. In order to apply this configuration to a smart-entry system, a detector for detecting the intention of the person to lock or unlock must be provided on the handle. However, this detector is not shown in the configuration shown in Patent Document 2. Furthermore, providing a detector would necessitate an electrical connection, and as the door handle part is always exposed to the outside, a configuration for protecting the electrically connecting part from wind, rain, and other inclement conditions would also be necessary.

With the foregoing in view, it is an object of the present invention to provide an apparatus for opening and closing a vehicle door that is exceptionally durable and provides indication enabling a person to reliably recognize the locked or unlocked state of a vehicle door.

In order to achieve the above object, the apparatus for opening and closing a vehicle door according to the present invention comprises control means for recognizing an intention of the person to lock or unlock the vehicle door and controlling the locking or unlocking of the vehicle door. The characterizing configuration of the apparatus is described hereunder.

Specifically, the apparatus is characterized in comprising a door handle for opening and closing a vehicle door;

an operation detector provided to the door handle in order to detect a state of the door handle as operated by the person;

an ornamental light part that is provided so as to enclose the periphery of the operation detector and is visible from an exterior of the door handle during actuation of the operation sensor by the person; and a light-emitting part for illuminating the ornamental light part; wherein the light emitting part is energized by the control means according to a controlled state in which the vehicle door is locked or unlocked.

As an example, the operation detector provided to the exterior of the door handle has an effect on the appearance of the vehicle and is therefore often installed in a small area. For this reason, in unlit locations at night the person may fail to visually locate the operation detector, or may cover the location of the operation detector with their own finger, which can make it impossible for the intention of the person to be satisfactorily recognized. However, according to the above characterizing configuration, the light-emitting part is energized to emit light in accordance with the controlled state in which the vehicle door is locked or unlocked, and the ornamental light part, which is visible from the exterior of the door handle and encloses the periphery of the operation detector actuated by the person, is illuminated. Therefore, this configuration is preferable in that the location to be operated can be clearly indicated to the person even at night and will not be covered by a finger.

The configuration above is further characterized in having a plurality of operation detectors, and the ornamental light part that is visible from the exterior of the door handle being provided to at least one of the operation detectors.

According to the above characterizing configuration, different operation detectors are provided for locking and unlocking, and the ornamental light part visible from the exterior of the door handle can be provided to at least one of the detectors. For example, the operation detectors may be configured so that when the door is unlocked, the detectors will detect hand contact when the handle is gripped, and when the door is locked, the detectors will detect a push switch, touch sensor, or other device provided to the exterior of the door handle being operated when touched by a finger. It is thus possible to obtain a preferred configuration in which an operation detector that is operable by a finger and is positioned in a small area on the exterior of the door handle can provide a satisfactory indication.

In this case, the light-emitting part and the operation detector equipped with the ornamental light part are preferably formed integrally, made waterproof, and housed inside the door handle. The door handle is always exposed on the exterior of the vehicle and is subjected to wind, rain, and other elements. However, the operation detectors, light-emitting part, and other parts housed inside the door handle have electrical connections, making it necessary to prevent water seepage. A configuration such as a switch module wherein the light-emitting part and the operation detector equipped with the ornamental light part are formed integrally and made waterproof is preferable in improving durability and reliability. Furthermore, having an integrated configuration means that maintenance-related replacement tasks are straightforward, and that replacement does not reduce operation detection functionality, light emission functionality, indication functionality of the ornamental light part, or other functionalities.

In the configuration above, the control means is equipped with recognition means for recognizing a portable device by means of telecommunication therebetween, and configured such that the control means recognizes the intention of a person to unlock the vehicle door based on detected information of the operation detector when it has been recognized that the portable device is approaching the vehicle; and the intention of the person to lock the vehicle door is recognized based on detected information of the operation detector when it is recognized that the portable device is moving from the vehicle interior to the vehicle exterior.

With this kind of configuration, the intention to lock or unlock can be recognized based on the recognized state of the portable device as the person carrying the portable device approaches the vehicle, moves from the vehicle interior to the vehicle exterior, or performs other similar actions. Therefore, the intention of the person can be more accurately recognized, and effective indication is possible.

This configuration is further suitable in that the control means is configured so that the light emission of the light-emitting part is continuously energized in the case of one condition selected from a condition in which the portable device is recognized as approaching the vehicle, and a condition in which the vehicle door is unlocked; and the light emission of the light-emitting part is intermittently energized in the case of the other condition selected from the condition in which the portable device is recognized as approaching the vehicle and the condition in which the vehicle is unlocked.

Light emission of the light-emitting part can thereby be energized continuously until the portable device approaches the vehicle, and the person operates the door handle, and light emission of the light-emitting part can be energized intermittently when the person operates and unlocks the door handle. Readiness to unlock is thereby indicated and the location to be operated for unlocking can be satisfactorily displayed until the door handle is operated by the person. Furthermore, when the door handle is operated and unlocked the completion of unlocking can be satisfactorily indicated.

The control means is further configured to continuously energize the light emission of the light-emitting part upon one of either the movement of the portable device from the vehicle interior to the vehicle exterior being recognized, or the vehicle being locked; and to intermittently energize the light emission of the light-emitting part upon the other of either the movement of the portable device from the vehicle interior to the vehicle exterior being recognized, or the vehicle being locked.

According to this configuration, locking is the same as above in that, e.g., when the portable device moves to the vehicle exterior, light emission of the light-emitting part is energized intermittently until the person operates the door handle, or light emission of the light-emitting part can be energized continuously until the person operates and locks the door handle. Readiness to lock is thereby indicated and the location to be operated for locking can be satisfactorily displayed until the door handle is operated by the person. Furthermore, when the door handle is operated and locked, the completion of locking can be satisfactorily indicated.

The operation detectors in the various configurations above have sensor electrodes for sensing contact with the body of the person, and can be configured to detect an operation state of the door handle via these sensor electrodes. In an alternative configuration, a switch that can be operated by the person is provided and the operation state of the door handle is detected via the switch.

It is preferable for a sensor electrode for sensing contact with a human body to be provided to the door handle and the operation state of the door handle to be detected via this sensor electrode, since it will be possible to detect the operation state of the door handle while the person naturally performs the action of operating the door handle in order to open the vehicle door. This arrangement is also preferred because after the person has exited the vehicle and closed the vehicle door, the switch provided on the door handle will again be operated, which will indicate the intention to lock the door, and instances of forgetting to lock the door will be eliminated. It shall be apparent that the person may operate the switch when unlocking, or the intention to lock may be transmitted via a sensor for sensing contact with the person when locking, and that locking and unlocking may be detected by the same method.

In the configuration above, the light-emitting part may change the emitted light to a plurality of colors, and the control means preferably controls the color of emitted light.

In this way, the light-emitting part is not limited to emitting a single color. When a plurality of colors can be emitted, the selection of the color of emitted light may be controlled by the control means. For example, if an LED (light-emitting diode) is used, a single element may change to emit two colors, red and green. Any light emission pattern for the light-emitting part is acceptable as long as the person can recognize the pattern. Therefore, the state of the vehicle door may be distinguished, e.g., not only by distinguishing between whether the light-emitting part is continuously or intermittently illuminated, but also by the color of emitted light. The person may mistakenly see only a portion of a blinking light pattern instead of a continuously illuminated light, or mistakenly see an extinguishing continuously illuminated light instead a blinking light, for example, but the frequency with which these kinds of mistakes are made can be reduced if the distinguishing is based on the color of emitted light.

It is also preferable for the control means to control the light-emitting part so as to emit light in a plurality of patterns by combining the color of emitted light and a light illumination pattern according to which the light-emitting part is continuously or intermittently energized to emit light.

For example, if the light-emitting part is configured to change between two colors, then combining the color of emitted light and the method of illumination (continuous or intermittent) will enable the light-emitting part to display at least four states (2 colors of emitted light 2 illumination methods=4 states). It is accordingly possible to display, e.g., an unlockable state, completed unlocking, a lockable state, and completed locking. Thus, combining the illumination pattern with the color of emitted light allows the person to be informed of several states in a readily identifiable manner.

DETAILED DESCRIPTION OF THE INVENTION

Embodiments for applying the present invention to a smart-entry system will be described below with reference to the accompanying drawings.

[System Configuration]

Figure 1:
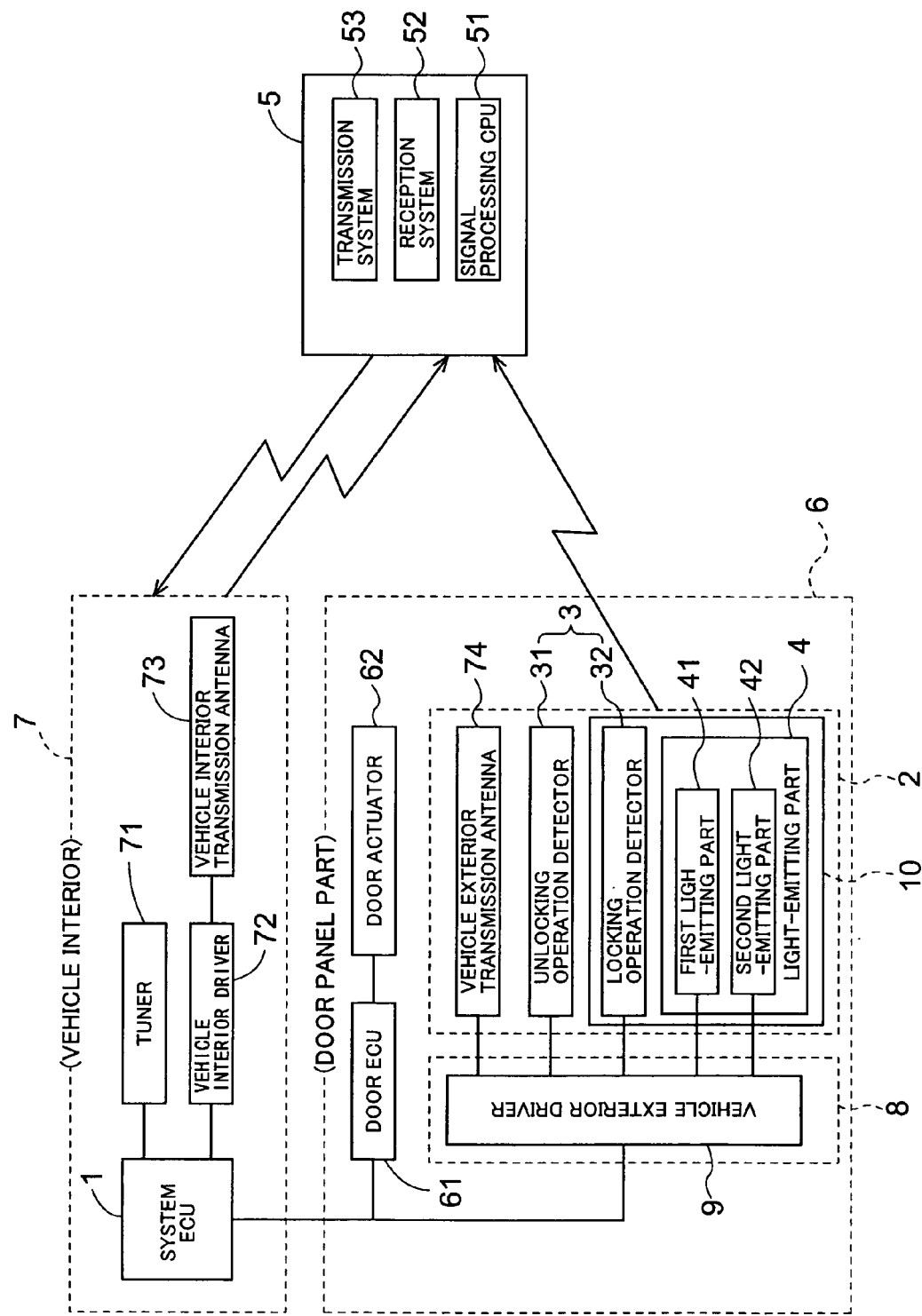
FIG. 1 shows an example of a system configuration according to an embodiment of the present invention.
Figure 2:
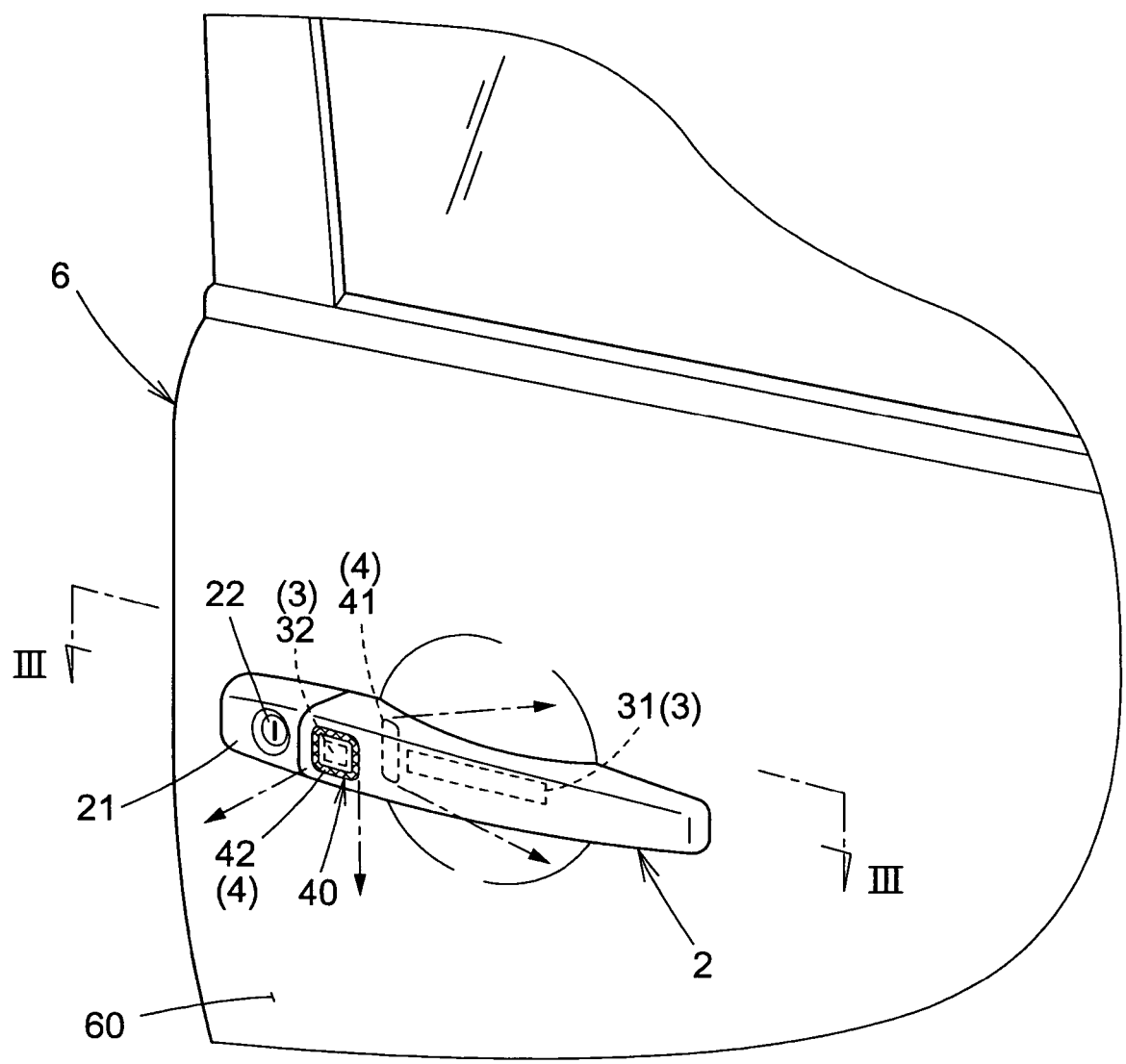
FIG. 2 is an oblique view showing an example of a vehicle door according to an embodiment of the present invention.

FIG. 1 shows an example of a system configuration according to an embodiment of the present invention. FIG. 2 is an oblique view showing an example of a vehicle door according to an embodiment of the present invention. A smart-entry system configuration will be explained initially with reference to FIG. 1. This system recognizes when a person (driver) carrying a portable device 5, known as a remote control, approaches the vehicle or moves to the vehicle exterior. The system then automatically controls the locking and unlocking of a vehicle door 6. For example, when the person carrying the portable device 5 approaches the vehicle, the approaching will be recognized from the vehicle side. When the person places a hand on a door handle 2 in order to attempt to open the vehicle door, the system recognizes the intention of the person to unlock and automatically controls the unlocking of the vehicle door 6.

As shown in FIG. 1, the portable device 5 carried by the person has a reception system 52 composed of an antenna, tuner, or other device for receiving electromagnetic waves from the vehicle; a transmission system 53 composed of an antenna, modulation circuit, or other device for transmitting electromagnetic waves to the vehicle; and a signal processing CPU 51 for controlling sending and receiving, interpreting received signals, generating transmitted signals, and performing other types of signal processing.

The vehicle interior is provided with a system ECU (Electronic Control Unit) 1 acting as control means for executing overall control over the smart-entry system; a tuner 71 for receiving transmitted signals from the portable device 5; a vehicle interior transmission antenna 73 for transmitting signals to the portable device 5; and a vehicle interior driver 72 for modulating, amplifying, and performing other processes on the signals transmitted via the vehicle interior transmission antenna 73. The system ECU 1 also has recognition means for recognizing the communication device 5 approaching the vehicle or the movement of the communication device 5 to the vehicle exterior, by communication with the portable device 5 via the above communication means.

As shown in FIG. 2, the door panel part of the vehicle door 6 is equipped with a door handle 2 acting as an operating part for operating the opening and closing of the vehicle door 6. The door handle 2 is supported by a handle frame 8 provided to the interior of the door panel part of the vehicle door 6 (see FIG. 3).

As shown in FIG. 1, a vehicle exterior transmission antenna 74 for transmitting signals to the portable device 5, an operation detector 3 for detecting the operation of the door handle 2 by the person, and a light-emitting part 4 for indicating the locked or unlocked state of the vehicle door 6 are provided to the door handle 2 mounted on the vehicle door 6. Furthermore, a vehicle exterior driver 9 for transferring the signals of the components provided to the door handle 2 is provided to the interior of a handle frame 8 that supports the door handle 2 on the vehicle door 6. Furthermore, a door actuator 62 for operating the lock (key) mechanism of the vehicle door 6 and performing locking and unlocking, and a door ECU 61 for controlling the door actuator 62 are provided to the interior of the door panel part of the vehicle door 6. The door ECU 61 and the vehicle exterior driver 9 are controlled by the system ECU 1.

In the present embodiment, the operation detector 3 provided to the door handle 2 has two members: an unlocking operation detector 31 for detecting the intention of the person to unlock, and a locking operation detector 32 for detecting the intention of the person to lock. The light-emitting part 4 has two parts, i.e., a first light-emitting part 41 and a second light-emitting part 42, so that light is emitted from the door handle 2 in different directions. For example, as shown in FIG. 2, the first light-emitting part 41 emits light into the space between the door handle 2 and the vehicle door 6, and the second light-emitting part 42 emits light to the exterior of the door handle 2.

[Configuration of Individual Parts]

Figure 3:
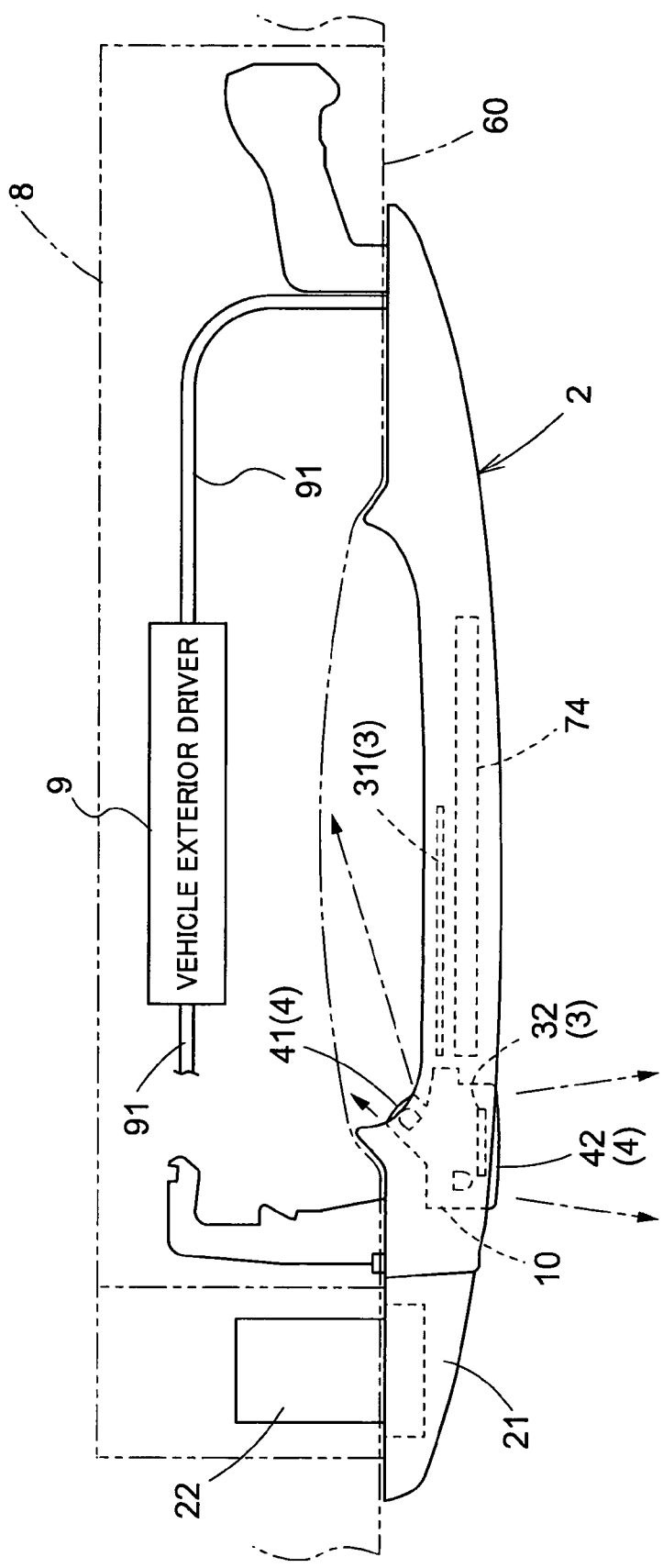
FIG. 3 is a cross-sectional view of a door handle part as seen from direction III in FIG. 2.

FIG. 3 is a cross-sectional view of the door handle part as seen from the direction III of FIG. 2. As shown in FIG. 3, the door handle 2 is supported by the handle frame 8 across a door panel 60. A handle cap 21 is also supported by the handle frame 8. A key cylinder 22 used for manually locking and unlocking of the vehicle door 6 with a mechanical key operation is provided to the handle cap 21. The vehicle exterior driver 9 is provided within the handle frame 8 and connected to the parts within the door handle 2 and to the system ECU 1 in the vehicle interior by a wire harness 91.

The vehicle exterior transmission antenna 74, the operation detector 3, and the light-emitting part 4 are provided to the interior of the door handle 2. As shown in FIG. 3, the vehicle exterior transmission antenna 74 is positioned in the central section of the door handle 2. The present embodiment is configured with a loop antenna employing ferrite, but it is also possible to use other configurations that correspond to the frequency band employed and can be positioned within the door handle.

The locking operation detector 32 is provided to the side that does not face the door panel 60 (the vehicle door 6) of the door handle 2, i.e., the outer side. The unlocking operation detector 31 is provided to the side that faces the door panel 60 of the door handle 2, i.e., the inner side. When a person attempts to open the vehicle door 6, the door handle is pulled by a hand. The unlocking operation detector 31 is provided to the inner side of the door handle 2 so that hand contact on the door handle 2 will be detected at such times. The locking operation detector 32 is provided to the outer side of the door handle 2 so that the intention to lock will be recognized from the person pushing or touching the outer side of the door handle 2 with a finger or other body part after exiting the vehicle and closing the vehicle door 6.

The first light-emitting part 41 is positioned on the inner side of the door handle 2 in the vicinity of the unlocking operation detector 31 as a component of the light-emitting part 4 in order to emit light into the space between the door handle 2 and the door panel 60 (the vehicle door 6). The second light-emitting part 42, which emits light outwardly, is positioned on the outer side of the door handle 2. The second light-emitting part 42 is disposed so as to surround the locking operation detector 32, as shown in FIG. 2, and is visible from the exterior of the door handle 2. The ornamental light part 40 is configured from a visible portion of the upper door handle 2. In other words, being in a circumferential configuration, the ornamental light part 40 can be satisfactorily recognized from the exterior when the person touches the locking operation detector 32 with a finger, even if the finger covers a portion thereof. The configuration of the ornamental light part 40 may continue completely or partially around the circumference of the locking operation detector 32. As long as the arrangement allows the location of the locking operation detector 32 to be clearly displayed, the configuration need not be limited to the form shown in FIG. 2.

Figure 4:
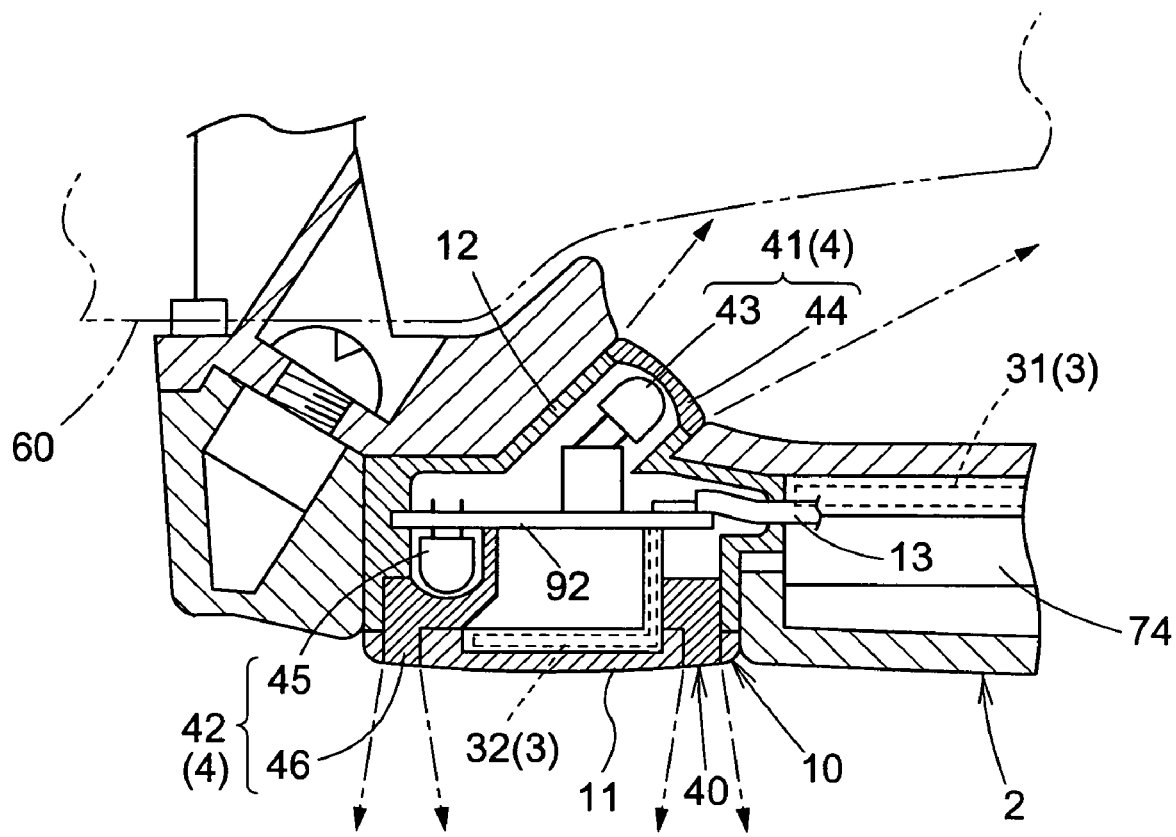
FIG. 4 shows a sample configuration of operation detectors and a light-emitting part according to an embodiment of the present invention.

In the present embodiment as shown in FIG. 3, the locking operation detector 32, the first light-emitting part 41, and the second light-emitting part 42 are integrated and configured as a switch module 10. FIG. 4 shows an example configuration of the operation detectors and the light-emitting parts according to an embodiment of the present invention. In the present example, a human detection sensor based on the electrostatic capacitance principle is used as the locking operation detector 32. The first light-emitting part 41 has an LED (light-emitting diode) 43 and a diffusing member 44 composed of a diffusing resin, and is arranged so as to emit light into the space between the door handle 2 and the door panel 60. The second light-emitting part 42 has an LED 45 and a diffusing member 46 composed of a diffusing resin, and is arranged so as to emit light to the exterior of the vehicle. The diffusing member 46 of the second light-emitting part 42 is arranged so as to surround the periphery of the locking operation detector 32, as has already been explained, and constitutes the ornamental light part 40 visible from the exterior of the door handle 2. In the present example, the LEDs and the diffusing members composed of diffusing resins are shown as being distinct, but the configuration is not limited thereto. Integrated LED modules or the like may be used.

As shown in FIG. 4, the LED 43 of the first light-emitting part 41 is mounted on one surface of a substrate 92, and the LED 45 of the second light-emitting part 42 is mounted on the other surface of the substrate 92. The human detection sensor of the locking operation detector 32 is also mounted on the substrate 92. The substrate 92 is mounted on a case 12 that is equipped with the diffusing member 44 for the LED 43. A cover part 11 equipped with the diffusing member 46 for the LED 45 covers and seals the case 12 in an airtight manner. In this case, a configuration may be employed wherein the locking operation detector 32 is arranged in advance on the reverse side of the cover part 11, and the locking operation detector and substrate 92 are connected with a wire or other component. A cable 13 is provided to the substrate 92 via the case 12. The cable is designed to electrically connect the first light-emitting part 41, the second light-emitting part 42, the locking operation detector 32, and the vehicle exterior driver 9. This cable 13 is joined together with the wire harness 91. A configuration is provided whereby the section of the cable 13 that passes through the case 12 and the interface section between the case 12 and the cover part 11 are sealed, and the switch module 10 is hermetically sealed so as to be waterproof.

The switch module 10 is thereby configured to be waterproof; therefore, the durability and reliability of the locking operation detector 32, the light-emitting part 4, and other components are increased. The components are preferably integrated into a single unit, which facilitates replacement tasks for maintenance purposes, and does not result in the operation detection functionality, light emission functionality, or ornamental light functionality being diminished as a result of replacement.

The present embodiment has been described using a human detection sensor based on the electrostatic capacitance detection principle as the locking operation detector 32 that constitutes the switch module 10. However, the configuration is not limited thereto; e.g., a mechanical key switch (push switch) or other configuration may be employed.

[Signal Processing]

Figure 5:
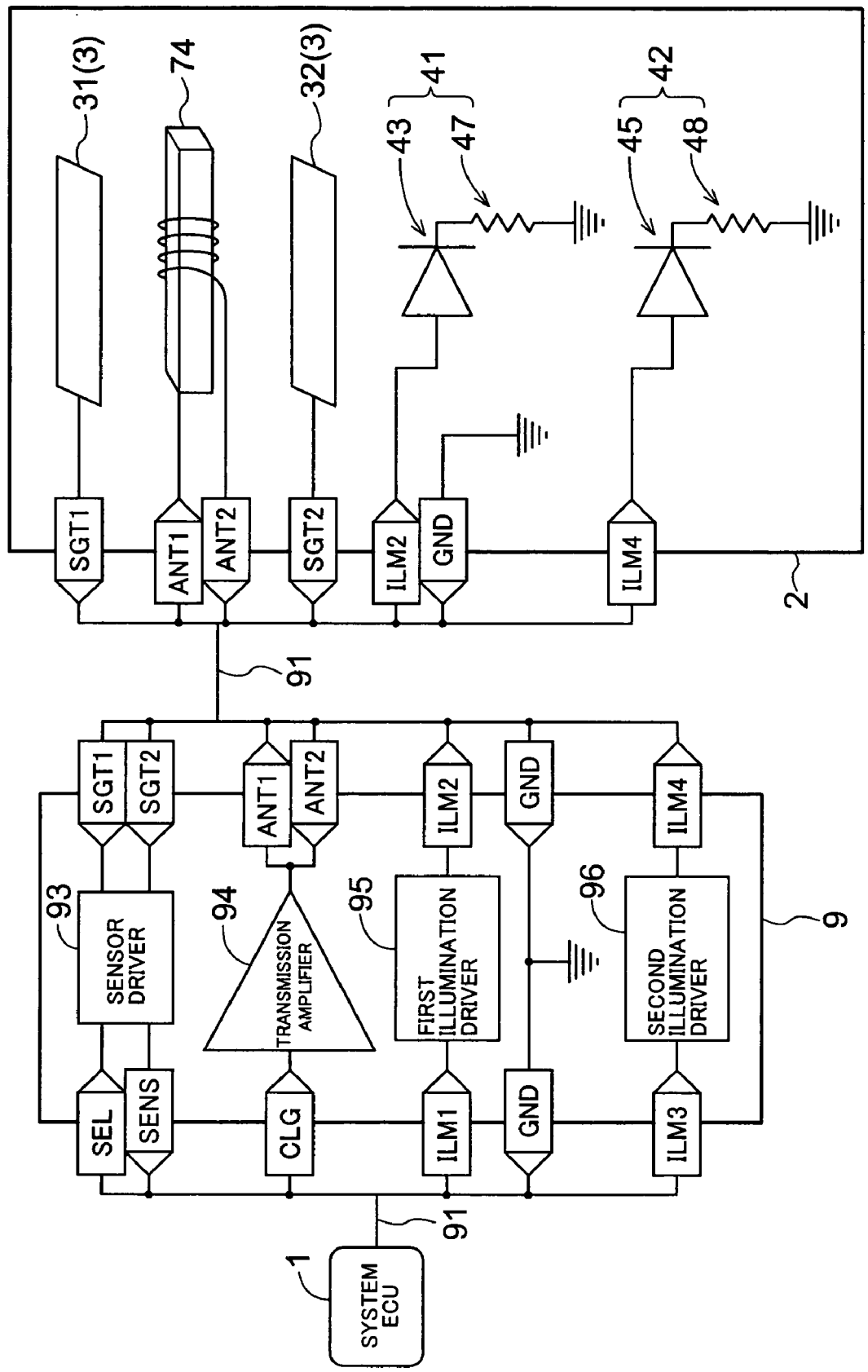
FIG. 5 is a block diagram showing an example of signal processing according to an embodiment of the present invention.

Following is a description and summary of signal processing according to the above configuration, with reference made to FIG. 5. FIG. 5 is a block diagram showing an example of signal processing according to an embodiment of the present invention. In the present embodiment, a human detection sensor that uses electrostatic capacitance detection is used with the unlocking operation detector 31 and the locking operation detector 32. The vehicle exterior driver 9 has a sensor driver 93 for the human detection sensor that constitutes these operation detectors 3; a transmission amplifier 94 for transmitting wireless signals to the portable device 5; a first illumination driver 95 for controlling the light-emitting part 4; and a second illumination driver 96.

Request signals are transmitted to the transmission amplifier 94 through the CLG terminal, modulated and amplified in the transmission amplifier 94, and then transmitted as electromagnetic waves from the vehicle exterior transmission antenna 74 within the door handle 2 to the vehicle exterior via the ANT1 terminal and the ANT2 terminal, all according to commands from the system ECU 1.

The detection signal from the operation detector 3 is transmitted to the sensor driver 93 via the STG1 terminal and the STG2 terminal. If it is necessary for the system ECU 1 to recognize the intention of the person to unlock, the system ECU 1 controls the sensor driver 93 via the SEL terminal so that signals input via the terminal STG1 from the unlocking operation detector 31 are transmitted to the system ECU 1 via the sensor driver 93. If it is necessary for the system ECU 1 to recognize the intention of the person to lock, the system ECU 1 controls the sensor driver 93 via the SEL terminal so that signals input via the terminal STG2 from the locking operation detector 32 are transmitted to the system ECU 1 via the sensor driver 93. In this way, the selected operation detection signals are transmitted via the SENS terminal to the system ECU 1 by signals input from the SEL terminal.

The system ECU 1 controls the light-emitting part 4 according to the locked or unlocked state of the vehicle door 6. The system ECU 1 controls the first illumination driver 95 and the second illumination driver 96, respectively, via the ILM1 terminal and the ILM3 terminal, causes a drive signal to be output by the light-emitting part 4, and causes light to be emitted by the first light-emitting part 41 and the second light-emitting part 42 via the ILM2 terminal and the ILM4 terminal. In the present embodiment, the first light-emitting part 41 and the second light-emitting part 42 have the LED 43 and LED 45. A resistance 47 and a resistance 48 provide resistance to limit the electrical current flowing into the LEDs. As used herein, the term "control of the light-emitting part 4" refers to control over illumination being enabled or disabled, and control or other action over continuous or intermittent (blinking) illumination. Additionally, when the LED 43 and the LED 45 are not monochrome LEDs but elements capable of emitting light in a plurality of colors, the selection of the color of emitted light may be controlled.

[Unlocking Operation]

Figure 6:
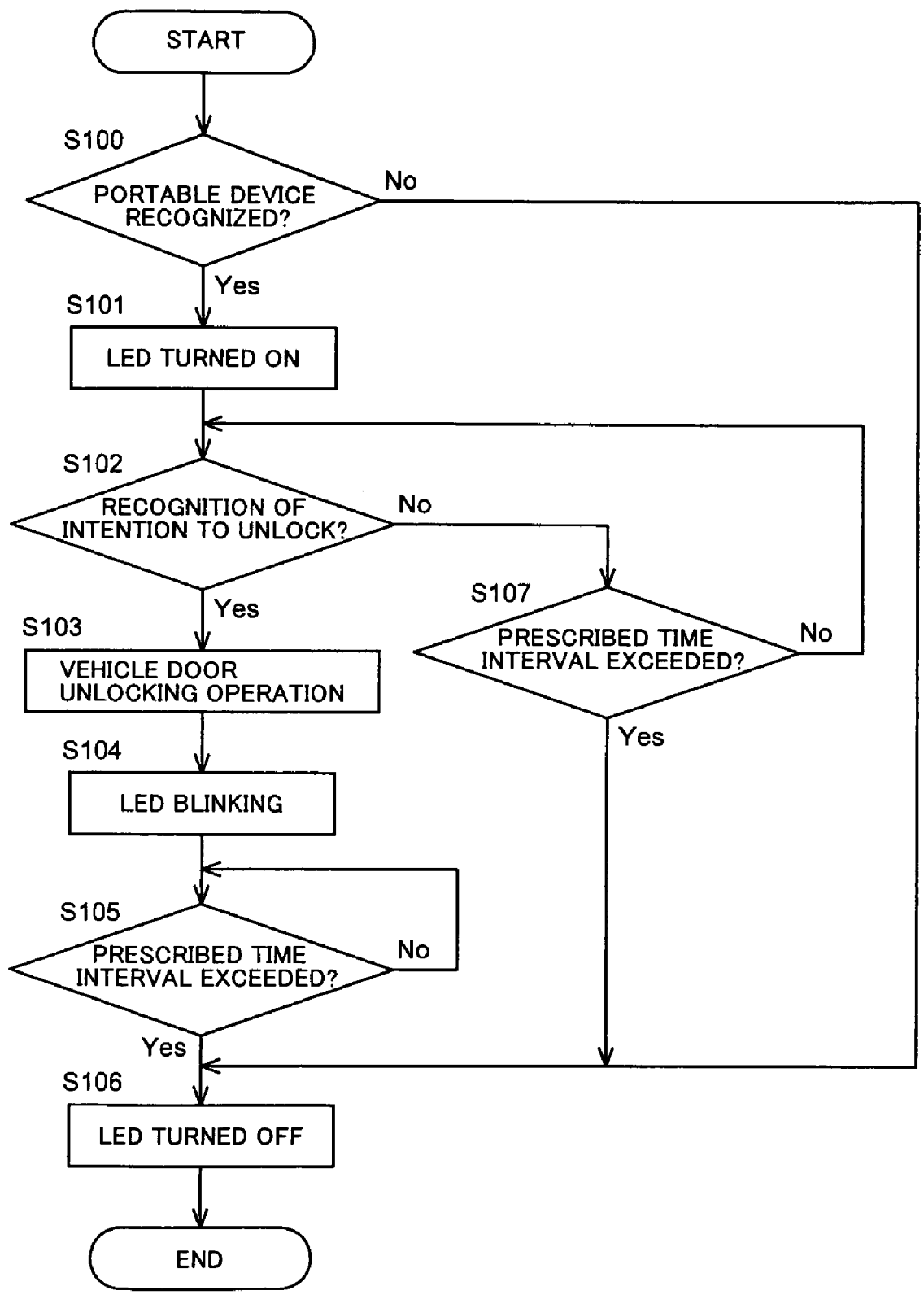
FIG. 6 is a flow chart showing an unlocking operation according to an embodiment of the present invention.

Following is a description of the operational flow for controlling locking and unlocking according to the above configuration. FIG. 6 is a flow chart showing the unlocking operation according to an embodiment of the present invention.

When the vehicle is in a parked and locked state, the system ECU 1 outputs a request signal to the vehicle exterior driver 9 positioned on the door panel 60 of the vehicle door 6 in order to recognize the portable device 5, which is an electronic key registered to the vehicle. The transmission amplifier 94 within the vehicle exterior driver 9 modulates and amplifies the request signal, and transmits electromagnetic waves to the vehicle exterior from the vehicle exterior transmission antenna 74 arranged on the door handle 2. If the portable device 5 approaches the vehicle at this point, the transmitted electromagnetic waves will be received by the reception system 52 of the portable device 5. The portable device 5 will then process the received signal in the signal processing CPU 51 and transmits the attributes, registration code, and other response information of the received signal via the transmission system 53. In this case, the attributes pertain to source-indicating information; e.g., that the received signal was transmitted via the vehicle exterior transmission antenna 74. On the vehicle side, electromagnetic waves transmitted from the portable device 5 are received by the tuner 71. The system ECU 1 verifies the attributes, registration code, and other response information, and recognizes that the portable device 5 serving as the electronic key registered for the vehicle has come close (step S100).

If the portable device 5 is recognized, the smart-entry system shifts to unlocking detection mode. In order to inform the person that a shift to unlocking detection mode has been made, the system ECU 1 energizes the first light-emitting part 41 to emit light. In other words, the LED 43 of the first light-emitting part 41 is turned on by the first illumination driver 95 of the vehicle exterior driver 9 (step S101). Furthermore, the system ECU 1 controls the sensor driver 93 of the vehicle exterior driver 9 via the SEL terminal, and monitors over a fixed time interval whether a detection signal is input from the unlocking operation detector 31 (step S102 and step S107). If a detection signal is not transmitted from the unlocking operation detector 31 to the system ECU 1 via the SENS terminal, even if the prescribed time interval is exceeded, the LED 43 is turned off (step S106) and the process ends.

If a detection signal is input from the unlocking operation detector 31 within the prescribed time interval, the system ECU 1 issues an unlock control to the door ECU 61. The door actuator 62 is then driven and the vehicle door 6 is unlocked (step S103). When the vehicle door 6 is unlocked, the system ECU 1 causes the LED 43 to illuminate intermittently (blink) (step S104), informing the person that the vehicle door 6 is unlocked. After blinking over a prescribed time interval (step S105), the LED 43 is turned off (step S106), and the unlocking process performed by the smart-entry system ends.

Any blinking pattern can be used as long as the pattern can be recognized by the person. Furthermore, in the present example, the state of the vehicle door 6 is indicated according to whether the LED 43 is continuously or intermittently illuminated. However, if the LED 43 is capable of changing the color of emitted light, the state of the vehicle door 6 may be expressed by controlling the changing of the color of emitted light. It shall be apparent that the indication operation of continuous illumination or blinking of the LED 43 may be reversed, and that indication may be performed via a combination of blinking or continuous illumination and changes in the color of emitted light.

In this way, when the person carrying the portable device approaches the vehicle and attempts to open the door, the vehicle door 6 can be satisfactorily unlocked when they place their hand on the door handle 2. It is additionally possible to indicate clearly that unlocking detection is in an enabled state (e.g., when the LED 43 is continuously illuminated) and that the door is unlocked (e.g., when the LED 43 is blinking). Therefore, the present system can offer exceptional convenience. Furthermore, when the surroundings are dark, such as at night, the person may have difficulty determining the location of the door handle 2. However, according to the present embodiment, the space between the opposing vehicle door 6 and door handle 2 is illuminated, allowing the person to place a hand on the door handle 2 without difficulty. As a result, the intention of the person to unlock can be satisfactorily detected by the unlocking operation detector 31 provided to the door handle 2, which increases the level of convenience provided to the person.

[Locking Operation]

Figure 7:
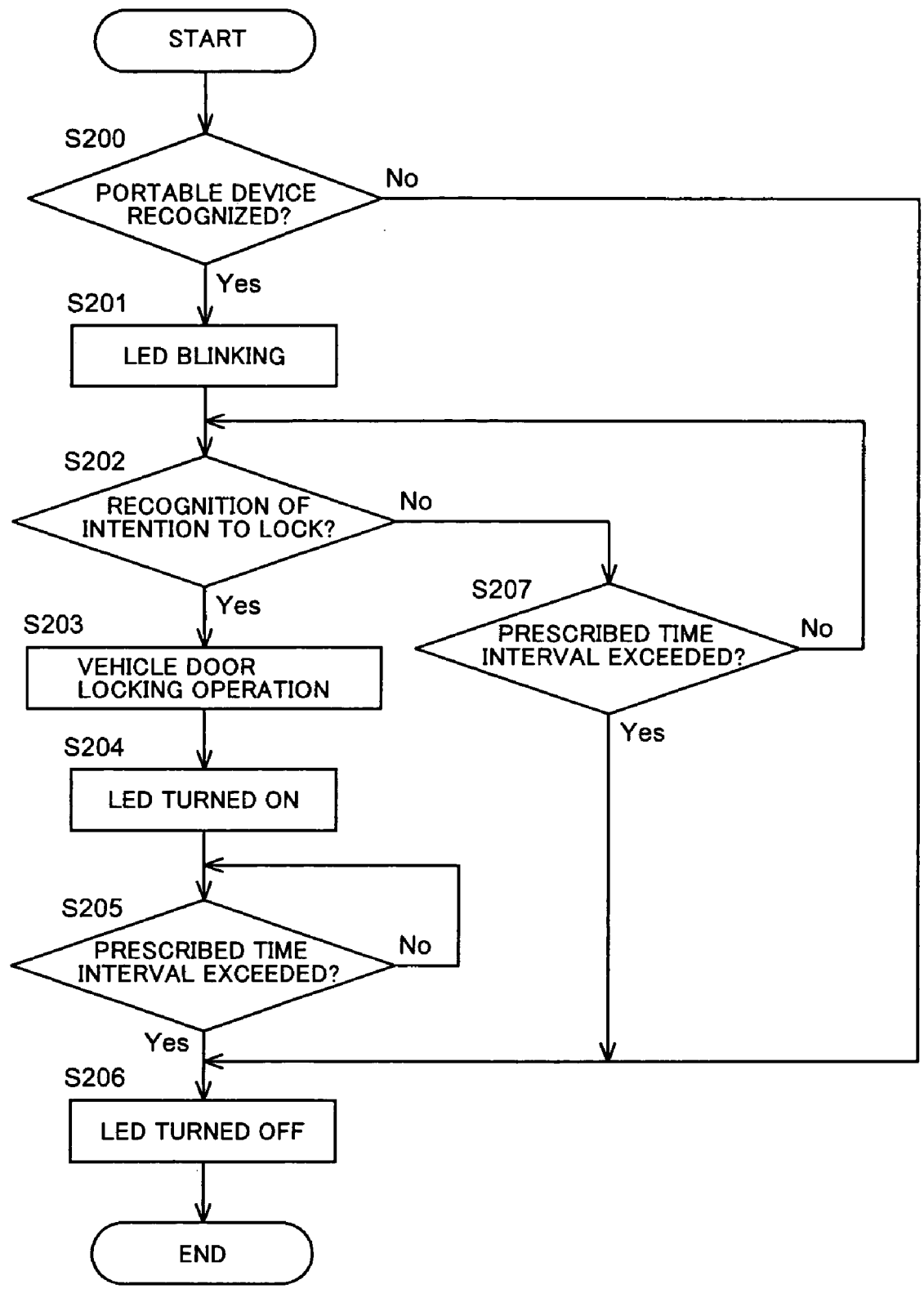
FIG. 7 is a flow chart showing a locking operation according to an embodiment of the present invention.

FIG. 7 is a flow chart showing the locking operation according to an embodiment of the present invention. The locking operation occurring when the person exits the vehicle will be described with reference to FIG. 7. When the person is in the vehicle interior, the portable device 5 (the electronic key) carried by the person is also in the vehicle interior. The portable device 5 receives a request signal that is modulated and amplified by the vehicle interior driver 72 positioned in the vehicle interior, and then transmitted from the vehicle interior transmission antenna 73 positioned in the vehicle interior. The portable device 5 processes the received signal in the signal processing CPU 51, and transmits the attributes, registration code, and other response information of the received signal via the transmission system 53. Electromagnetic waves transmitted from the portable device 5 are received by the tuner 71. The system ECU 1 verifies the response information and recognizes the presence of the portable device 5 within the vehicle.

When the person carries the portable device 5, exits the vehicle, and closes the vehicle door 6 in this state, the aforedescribed communication is stopped, and the system ECU 1 recognizes that the portable device 5 has moved from the vehicle interior to the vehicle exterior (step S200). It is possible for verification to be performed in combination therewith in regard to the ability for communication to be established with the signals transmitted by the vehicle exterior transmission antenna 74, as described for the unlocking operation.

Upon verifying that the person has exited the vehicle and closed the vehicle door 6, the smart-entry system shifts to locking detection mode.

In order to inform the person that a shift to locking detection mode has been made, the system ECU 1 energizes the second light-emitting part 42 to emit light. In other words, the LED 45 of the second light-emitting part 42 is caused to illuminate intermittently (blink) by the second illumination driver 96 of the vehicle exterior driver 9 (step S201). When the LED 45 blinks, the blinking pattern will be visible from the exterior of the door handle 2 via the ornamental light part 40. Any blinking pattern may be used as long as the pattern can be recognized by the person. Additionally, the system ECU 1 controls the sensor driver 93 of the vehicle exterior driver 9 via the SEL terminal and monitors over a prescribed time interval whether a detection signal is input from the locking operation detector 32 (step S202 and step S207). If a detection signal is not transmitted from the locking operation detector 32 to the system ECU 1 via the SENS terminal, even if the prescribed time interval is exceeded, the LED 45 will be turned off (step S206) and the process ends.

If a detection signal is input from the locking operation detector 32 within the prescribed time interval, the system ECU 1 issues a locking control command to the door ECU 61. The door actuator 62 is then driven and the vehicle door 6 is locked (step S203). When the vehicle door 6 is locked, the system ECU 1 causes the LED 45 to be turned on (step S204), informing the person that the vehicle door has been locked. After being continuously illuminated over a prescribed time interval (step S205), the LED 45 is turned off (step S206) and the locking process as performed by the smart-entry system ends.

In the present example, the ornamental light part 40 is illuminated in order to indicate the state of the vehicle door according to blinking or continuous illumination, or, rather, according to the pattern of intermittent or continuous illumination, of the LED 45. However, if the LED 45 is capable of changing the color of emitted light, the state of the vehicle door 6 may be indicated by performing control to change the color of emitted light. It shall be apparent that the indication operation using continuous illumination or blinking of the LED 45 can be reversed, and indication may be performed via a combination of blinking, continuous illumination, and changes in the color of emitted light.

For example, the light-emitting part 42 may be configured to have an LED that can change between emitting two colors of light. In this case, by combining the color of emitted light and the method of illumination (illumination pattern: continuous or intermittent), the ornamental light part 40 can display at least four states (2 colors of emitted light 2 illumination methods=4 states). In other words, it is possible to display four states: an unlockable state, completed unlocking, a lockable state, and completed locking. Control may also be simultaneously performed on the light-emitting part 42 side during the unlocking operation described above as another possible embodiment, but a detailed description of the embodiment will be omitted.

It is thus possible to indicate clearly that locking detection is in an enabled state (e.g., when the LED 45 is intermittently illuminated) and that the door is locked (e.g., when the LED 45 is turned on). Therefore, the present system can offer exceptional convenience. Furthermore, when the surroundings are dark, such as at night, the person may have difficulty determining the location of the locking operation detector 32 provided to the outer side of the door handle 2. However, according to the present embodiment, the ornamental light part 40 is provided to the periphery of the locking operation detector 32. Therefore, even if the locking operation detector 32 is operated with a finger, for example, the ornamental light part 40 will not be completely covered and the locking operation detector 32 may be operated satisfactorily. As a result, the intention of the person to unlock can be satisfactorily detected by the locking operation detector 32, which improves the level of convenience provided to the person.

Alternate Embodiments

Figure 8:
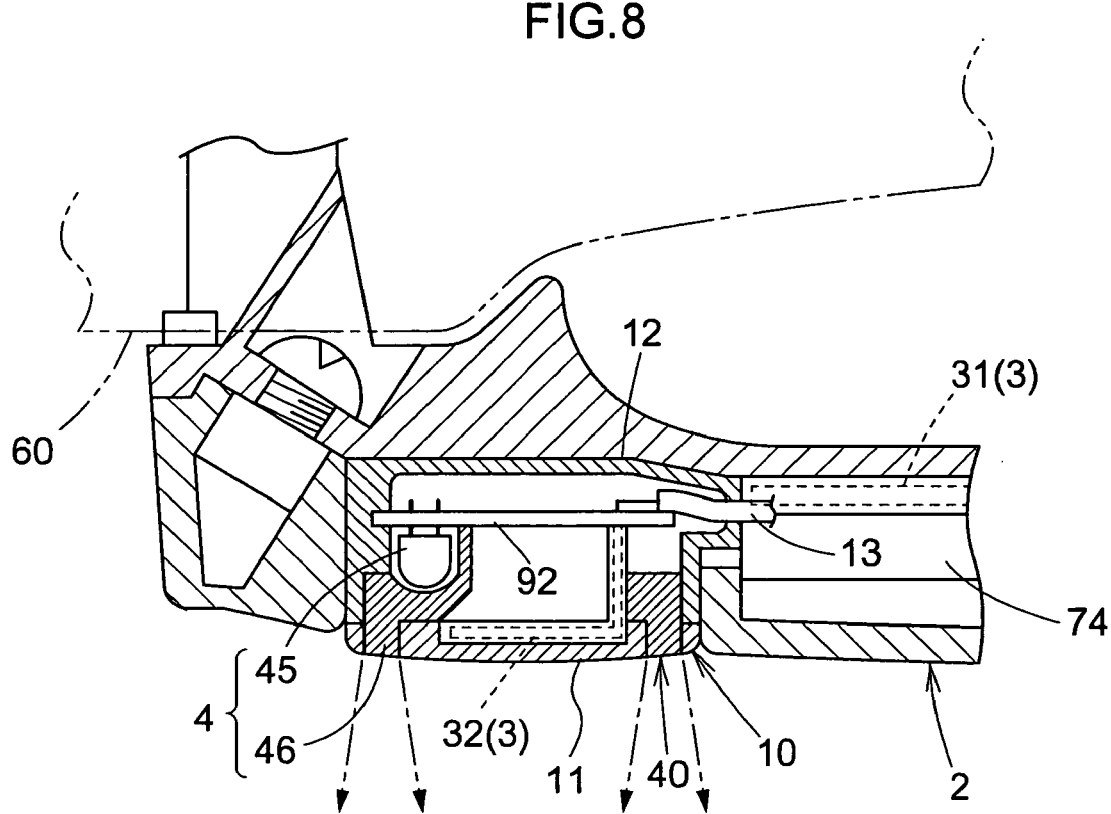
FIG. 8 shows a sample configuration of operation detectors and light-emitting part according to a second embodiment of the present invention.
Figure 9:
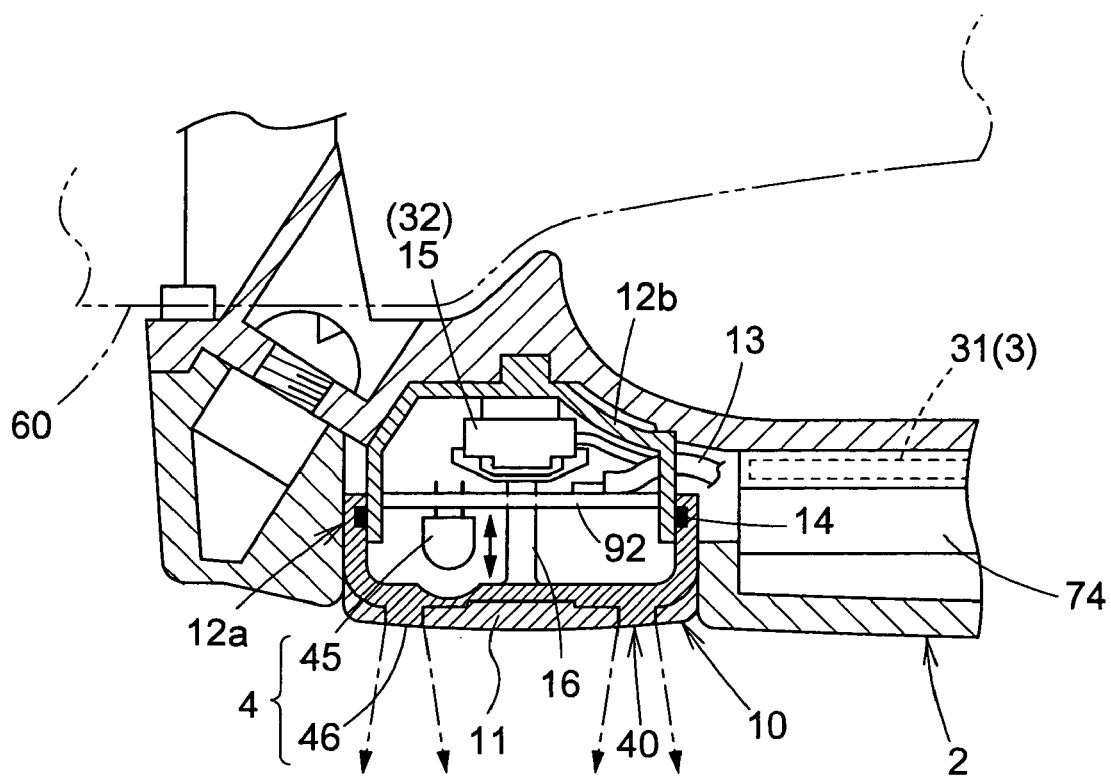
FIG. 9 shows a sample configuration of operation detectors and a light-emitting part according to a third embodiment of the present invention.

An example configured such that light is emitted in different directions upon locking and unlocking was used in the description above, but it shall be apparent that the present invention may be used in a configuration wherein light is emitted in only one direction. FIG. 8 shows a sample configuration of operation detectors and a light-emitting part according to a second embodiment of the present invention, and FIG. 9 shows a sample configuration of operation detectors and a light-emitting part according to a third embodiment of the present invention. FIGS. 8, 9 show configurations having only a light-emitting part 4 corresponding to the second light-emitting part 42 of the earlier embodiment. FIG. 8 is an example using the same electrostatically capacitive human detection sensor as in the earlier embodiment for the locking operation detector 32 that constitutes the switch module 10. FIG. 9 is an example using a mechanical key switch or other type of push-button switch. The system configuration, signal processing, unlocking operation flow, locking operation flow, and other aspects should be made to accord with the embodiment explained above, and as such a detailed description of those aspects will be omitted.

Following is an explanation of the second embodiment. As shown in FIG. 8, the LED 45 of the light-emitting part 4 and the human detection sensor of the locking operation detector are mounted on one surface of the substrate 92. The substrate 92 is mounted on the case 12, which is covered and hermetically sealed by the cover part 11 equipped with the diffusing member 46 for the LED 45 that functions as the ornamental light part 40. In this case, it is possible to provide a configuration wherein the locking operation detector 32 is positioned in advance on the reverse side of the cover part 11, and the locking operation detector 32 and the substrate 92 are connected using a wire or other component. A cable 13 is provided to the substrate 92 via the case 12 for electrically connecting the light-emitting part 4, the locking operation detector 32, and the vehicle exterior driver 9. This cable 13 is joined together with the wire harness 91. A configuration is provided whereby the section of the cable 13 that passes through the case 12 and the interface section between the case 12 and the cover part 11 are sealed, and the switch module 10 is hermetically sealed so as to be waterproof.

Following is a description of the third embodiment. FIG. 9 is an example showing a configuration wherein a mechanical key switch is used as the locking operation detector 32. As shown in the drawing, the LED 45 of the light-emitting part 4 is mounted on one surface of the substrate 92. A switch 15 is mounted on a fixed case 12b. The substrate 92 is attached to the switch 15 so as to act as a cover. A through-hole is provided to the substrate 92 to accommodate a transmission member 16, which transmits operational force to the mechanical key of the switch 15. The transmission member 16 is provided to a sliding case 12a along with an operating part 11 that is operated by being pushed by a person, and with the diffusing member 46 that is composed of a diffusing resin and functions as the ornamental light part 40. The sliding case 12a covers the fixed case 12b with an O-ring 14 sandwiched therebetween, and constitutes the integrated switch module 10. The sliding case 12a is configured to slide in the direction of the fixed case 12b fixed to the door handle 2 when the person presses the switch module 10, so that the mechanical key of the switch 15 will be pushed. The O-ring 14 is held between the sliding case 12a and the fixed case 12b during this action, and maintains waterproofness. Furthermore, the cable 13 that electrically connects the light-emitting part 4, the locking operation detector 32, and the vehicle exterior driver 9 is provided through the fixed case 12b. As in the other sample configurations, the cable 13 is joined together with the wire harness 91. The section of the cable 13 that passes through the case 12b is sealed, and the switch module 10 is kept waterproof.

As described above, the present invention can provide an apparatus for opening and closing a vehicle door that is exceptionally durable, and performs indications so that a person can reliably recognize the locked or unlocked state of a vehicle door.

INDUSTRIAL APPLICABILITY

The present invention recognizes the intention of a person to lock or unlock a vehicle door, and can be used as an apparatus for opening and closing a vehicle door corresponding to a locking system (smart-entry system) that controls the locking and unlocking of the vehicle door.

The invention claimed is:

1. An apparatus for opening and closing a vehicle door, comprising:
   a door handle on an outer surface of the vehicle door for performing an opening and closing operation of the vehicle door from outside the vehicle;
   an operation detector comprising an unlock operation detector for detecting an intention of a user to unlock the vehicle door and a lock operation detector for detecting an intention of the user to lock the vehicle door,
   an electric control means for recognizing the intention of the user to lock or unlock the vehicle door and controlling the locking or unlocking of the vehicle door; and
   a light-emitting part positioned on the door handle and energized by the electric control means, the light-emitting part including a housing, first and second LEDs positioned on opposed ends of the housing and an ornamental light part covering the second LED, wherein
   the first LED is oriented to emit a light in a direction toward the vehicle door when the user's intention is to unlock the vehicle door,
   the second LED is oriented opposite to the first LED to emit a light in a direction away from the vehicle door when the user's intention is to lock the vehicle door,
   the ornamental light part encloses a periphery of the lock operation detector, and the light emitted from the second LED passes through the ornamental light part to allow the user to visually recognize an invitation to operate the lock operation detector for locking the vehicle door and a subsequent establishment of the locked state of the vehicle door, and
   the lock operation detector is located in the housing as an integrated module with the light-emitting part and the unlock operation detector is located on the door handle outside the housing.

2. The apparatus for opening and closing a vehicle door according to claim 1, wherein
   the electric control means comprises recognition means for recognizing via telecommunication a portable device carried by the user;
   the electric control means recognizes the intention of the user to unlock the vehicle door based on detected information of the unlock operation detector when the portable device has been recognized to have come closer to the vehicle; and
   the intention of the user to lock the vehicle door is recognized based on detected information of the lock operation detector when the portable device has been recognized to have moved from the vehicle interior to the vehicle exterior.

3. The apparatus for opening and closing a vehicle door according to claim 2, wherein
   the electric control means continuously energizes the first LED to emit light in the case of one condition selected from a condition in which the portable device is recognized as approaching the vehicle, and a condition in which the vehicle door is unlocked; and
   intermittently energizes the first LED to emit light in the case of the other condition selected from the condition in which the portable device is recognized as approaching the vehicle and the condition in which the vehicle door is unlocked.

4. The apparatus for opening and closing a vehicle door according to claim 2, wherein
   the electric control means continually energizes the second LED to emit light in the case of one condition selected from a condition in which the portable device is recognized as moving from the vehicle interior to the vehicle exterior, and a condition in which the vehicle door is locked; and
   intermittently energizes the second LED to emit light in the case of the other condition selected from the condition in which the portable device is recognized as moving from the vehicle interior to the vehicle exterior, and the condition in which the vehicle door is locked.

5. The apparatus for opening and closing a vehicle door according to claim 1, wherein
   the operation detector has a sensor electrode for detecting contact with the user, and detects an operation state of the door handle using the sensor electrode.

6. The apparatus for opening and closing a vehicle door according to claim 1, wherein
   the operation detector has a switch that is capable of being operated by the user, and detects an operation state of the door handle using the switch.

7. The apparatus for opening and closing a vehicle door according to claim 1, wherein
the light-emitting part may change the color of emitted light to a plurality of colors; and
the electric control means controls the color of emitted light.

8. The apparatus for opening and closing a vehicle door according to claim 7, wherein
the electric control means causes the light-emitting part to emit light in a plurality of light emission patterns by combining the color of emitted light and a light illumination pattern according to which the light-emitting part is continuously or intermittently energized to emit light.

9. The apparatus for opening and closing a vehicle door according to claim 1, wherein the ornamental light part is a diffusing member.

10. The apparatus for opening and closing a vehicle door according to claim 9, wherein the diffusing member is diffusing resin.

11. The apparatus for opening and closing a vehicle door according to claim 1, wherein the ornamental light part surrounds the lock operation detector in a square-shaped manner.

12. The apparatus for opening and closing a vehicle door according to claim 1, wherein the ornamental light part includes an outer surface directed toward outside the door handle.

13. An apparatus for opening and closing a vehicle door, comprising:
a door handle on an outer surface of the vehicle door for performing an opening and closing operation of the vehicle door from outside the vehicle;
an operation detector comprising an unlock operation detector for detecting an intention of a user to unlock the vehicle door and a lock operation detector for detecting an intention of the user to lock the vehicle door,
an electric control means for recognizing the intention of the user to lock or unlock the vehicle door and controlling the locking or unlocking of the vehicle door; and
a light-emitting part positioned on the door handle and energized by the electric control means, the light-emitting part including a housing, first and second LEDs positioned on opposed ends of the housing and a light illuminating part covering the second LED, wherein
the first LED is oriented to emit a light in a direction toward the vehicle door when the user's intention is to unlock the vehicle door,
the second LED is oriented opposite to the first LED to emit a light in a direction away from the vehicle door when the user's intention is to lock the vehicle door,
the light illuminating part encloses a periphery of the lock operation detector, and the light emitted from the second LED passes through the light illuminating part to provide a visual indication of a locked state of the vehicle to the user exterior of the vehicle, and
the lock operation detector is located in the housing as an integrated module with the light-emitting part and the unlock operation detector is located on the door handle outside the housing.

14. The apparatus for opening and closing a vehicle door according to claim 13, wherein the light illuminating part is a diffusing member.

15. The apparatus for opening and closing a vehicle door according to claim 14, wherein the diffusing member is diffusing resin.

16. The apparatus for opening and closing a vehicle door according to claim 13, wherein the illuminating light part surrounds the operation detector in a square-shaped manner.

17. The apparatus for opening and closing a vehicle door according to claim 13, wherein the light illuminating part includes an outer surface directed toward outside the door handle.

18. An apparatus for opening and closing a vehicle door, comprising:
a door handle mounted on an outer surface of a vehicle door and operable from outside the vehicle door to perform an opening and closing operation of the vehicle door;
an operation detector comprising an unlock operation detector for detecting a user's intention to unlock the vehicle door and a lock operation detector for detecting the user's intention to lock the vehicle door;
a cable electrically connected to the lock operation detector;
an electric control means for recognizing the intention of the user to lock or unlock the vehicle door and controlling the locking or unlocking of the vehicle door; and
a light-emitting part positioned on the door handle and energized by the electric control means, the light-emitting part including a housing, first and second LEDs positioned on opposed ends of the housing and a light illuminating part covering the second LED, wherein
the light illuminating part encloses a periphery of the operation detector, the light illuminating part being positioned relative to the second LED so that the light emitted from the second LED passes through the light illuminating part and provides a visual indication of a locked state of the vehicle to the user exterior of the vehicle, and
the lock operation detector is located in the housing as an integrated module with the light-emitting part and the unlock operation detector is located on the door handle outside the housing.

19. The apparatus for opening and closing a vehicle door according to claim 18, wherein the first LED emits light into a space between the door handle and the outer surface of the vehicle door when energized by the control means.

* * * * *